United States Patent
Magar et al.

(10) Patent No.: US 10,509,857 B2
(45) Date of Patent: *Dec. 17, 2019

(54) SIZE REDUCER FOR TABULAR DATA MODEL

(71) Applicant: Microsoft Technology Licensing, LLC, Redmond, WA (US)

(72) Inventors: David Magar, Tel Aviv (IL); Daniel L Hoter, Herzliya (IL); Alexey Efron, Haifa (IL); Liron Eizenman, Tel-Aviv (IL); Michael Be'eri, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1081 days.

This patent is subject to a terminal disclaimer.

(21) Appl. No.: 13/686,017

(22) Filed: Nov. 27, 2012

(65) Prior Publication Data
US 2014/0149840 A1   May 29, 2014

(51) Int. Cl.
*G06F 17/24*   (2006.01)

(52) U.S. Cl.
CPC ................... *G06F 17/246* (2013.01)

(58) Field of Classification Search
CPC ............ C06F 17/30; G06F 17/60; G06F 17/245–246; G06F 16/2291; G06F 16/245; H04K 1/00; H04L 9/00; H04N 7/167
USPC ............... 715/227; 707/503, 504, 500, 104; 705/76
See application file for complete search history.

(56) References Cited

U.S. PATENT DOCUMENTS

| | | | | |
|---|---|---|---|---|
| 5,572,644 | A | * | 11/1996 | Liaw .............. G06F 3/0481 345/419 |
| 5,926,822 | A | * | 7/1999 | Garman ................. 715/201 |
| 6,223,171 | B1 | | 4/2001 | Chaudhuri et al. |
| 6,898,608 | B2 | | 5/2005 | Hopeman et al. |
| 7,069,179 | B2 | | 6/2006 | Kim et al. |
| 7,143,046 | B2 | | 11/2006 | Babu et al. |
| 8,037,096 | B2 | | 10/2011 | Champion et al. |
| 8,639,593 | B1 | * | 1/2014 | Gallagher .......... G06Q 40/02 705/30 |

(Continued)

OTHER PUBLICATIONS

Javaid, "Excel 2010: Split Column Data into Two [Parse Cells]", published online on Mar. 2, 2010, http://www.addictivetips.com/microsoft-office/excel-2010-split-column-data-into-two-parse-cells/. Javaid'2010.*

(Continued)

*Primary Examiner* — Justin S Lee
(74) *Attorney, Agent, or Firm* — Workman Nydegger (57) ABSTRACT

A size reducer for tabular data models. As the tabular data model is being created, the size reducer evaluates one or more columns of the tabular data model. For a given column, the memory burden and data type of the column are determined. Based on this information, the size reducer automatically determines at least one modification that can be made to the column (as compared to the source column at the data source) in order to reduce the size of the column's burden in the tabular data model. Example modifications might include splitting of column as compared to its source column in the data source, removing information (e.g., rounding) from a column as compared to its source column, and even eliminating columns from the tabular data model that are present in the external data source.

18 Claims, 4 Drawing Sheets

(56) References Cited

U.S. PATENT DOCUMENTS

| | | | |
|---|---|---|---|
| 2003/0182246 A1* | 9/2003 | Johnson et al. | 705/76 |
| 2005/0222931 A1* | 10/2005 | Mamou | G06F 17/30563 705/35 |
| 2005/0228808 A1* | 10/2005 | Mamou et al. | 707/100 |
| 2005/0278052 A1* | 12/2005 | Bett | G05B 23/0229 700/108 |
| 2006/0004686 A1* | 1/2006 | Molnar | G06F 17/30297 |
| 2006/0041544 A1* | 2/2006 | Santosuosso | G06F 17/30424 |
| 2006/0069717 A1* | 3/2006 | Mamou | G06Q 10/10 709/203 |
| 2007/0112586 A1 | 5/2007 | Dettinger et al. | |
| 2010/0211872 A1 | 8/2010 | Rolston et al. | |
| 2010/0268715 A1 | 10/2010 | Seo et al. | |
| 2011/0004488 A1* | 1/2011 | Benja-Athon | G06F 19/325 705/2 |
| 2011/0055722 A1* | 3/2011 | Ludwig | G06F 3/04847 715/751 |
| 2011/0126126 A1* | 5/2011 | Blair | G06Q 10/107 715/752 |
| 2013/0054603 A1* | 2/2013 | Birdwell et al. | 707/738 |
| 2014/0149841 A1 | 5/2014 | Magar et al. | |

OTHER PUBLICATIONS

Excel'2011: "Excel 2010 Performance: Performance and Limit Improvements", published by Microsoft, published in Jun. 2010, last modified date: Apr. 11, 2011.*

Smithee'2012: Smithee et al. "How to Split Excel Data Into Two Columns", (at https://web.archive.org/web/20121118160848/http://smallbusiness.chron.com/split-excel-data-two-columns-54661.html, captured by WaybackMachine on Nov. 18, 2012, Smithee'2012).*

Velayutham, "Export DataSet to Excel", published online on Sep. 15, 2010, at http://www.c-sharpcorner.com/uploadfile/babu_2082/export-dataset-to-excel/.*

"Get Digital Help: How to extract a unique distinct list from a column in Excel", archive.org: Jan. 14, 2012, https://web.archive.org/web/20120114035340/https://www.get-digital-help.com/2009/03/30/how-to-extract-a-unique-list-and-the-duplicates-in-excel-from-one-column/ (Year: 2012).*

"Get Digital Help: How to extract a unique distinct list from a column in Excel", archive.org: Jan. 14, 2012, http://www.get-digital-help.com:80/2011/03/23/text-to-columns-split-words-in-a-cell-excel-array-formula/comment-page-1/, hereafter ExcelHelp'2012A) (Year: 2012).*

Russo, Marco, "Optimizing High Cardinality Columns in VertiPaq", Internet Archive Webpage, Jan. 29, 2012, pp. 1-3. Available at <<http:/ web.archive.org/web/20120129175355/http://www.sqlbi.com/articles/optimizing-high-cardinality-columns-in-vertipaq/>>.

Ryan, Dustin, "Creating Your First Tabular Model (part 1)", Mar. 22, 2012, pp. 1-9. Available at <<http://sqldusty.wordpress.com/2012/03/22/creating-your-first-tabular-model-part-i/>>.

Davis, Mark, "The New Tabular BI Semantic Model—What is it Good for?", Sep. 13, 2012, Available at <<http://www.teamscs.com/2012/09/the-new-tabular-bi-semantic-model-what-is-it-good-for/>>.

International Search report & Written Opinion for PCT Patent Application No. PCT/US2013/072409, dated Aug. 12, 2014, Filed Date: Nov. 27, 2013, 11 pages.

International Search report & Written Opinion for PCT Patent Application No. PCT/US2013/072431, dated Aug. 12, 2014, Filed Date: Nov. 27, 2013, 10 pages.

Kote, Sparjan, "In-memory computing in Business Intelligence", Published on: Mar. 19, 2011, Available at: http://www.infosysblogs.com/oracle/2011/03/in-memory_computing_in_busines.html.

"Non-Final Office Action Issued in U.S. Appl. No. 13/714,108", dated Dec. 1, 2015, 29 Pages.

"Excel Specifications and Limits", Retrieved from <<https:/ support.office.com/en-nz/artide/Excel-specifications-and-limits-1672b34d-7043-467e-8e27-269d656771c3>>, Jun. 2010, 6 Pages.

Murray, Katherine, "First Look: Microsoft Office 2010—Release Notes", Retrieved from <<http://download.microsoft.com/download/a/2/2/a2230604-abfd-4efc-80c4-801c31f6335e/AF102645635_en-us_014mspressfirstlook_releasenotesall.pdf>>, Jun. 23, 2010, 20 Pages.

Office Action dated Jul. 15, 2015 cited in U.S. Appl. No. 13/714,108.
Office Action dated Feb. 20, 2015 cited in U.S. Appl. No. 13/714,108.

* cited by examiner

|   | A ↓ | B ↓ | C ↓ |
|---|---|---|---|
| I → | A - I | B - I | C - I |
| II → | A - II | B - II | C - II |
| III → | A - III | B - III | C - III |
| IV → | A - IV | B - IV | C - IV |

SIZE REDUCER FOR TABULAR DATA MODEL

BACKGROUND

Information system store enormous amounts of data in databases. These databases can be relational or non-relational containing very structured data or less structured data. Often, databases are transformed to many different formations to ease consumption of the data by various clients. The information in database systems is often stored in tables where a single database can contain many tables.

Many modern applications in retail, finance, science, and so forth, require analysis to be performed over the data stored in databases. Such analysis can include finding the most sales-effective products in a store's inventory or the most financially yielding asset in a portfolio. Business users of all kinds then use business intelligence analytics systems to find answers to business questions that require complex calculations.

To perform these complex calculations, an analytics system uses data models, which are abstractions used to gather information from one or many data sources, such as databases. These abstractions are then queried by the analytics system to perform the necessary analysis so that business users can receive answers to their business questions. The above data models can store data in many forms (cubes, tables, and so forth) depending on the querying application's requirements, format, desired speed of calculation, and so forth.

The data model is created when the analytics system pulls data from external data sources (such as databases) and stores that data wherever the analytics system resides so that the data model could be queried upon request by the analytics system's users. Analytics systems can be based on a client-server architecture, where the data models would be stored on the server side while clients would submit queries. On the other hand, the analytics system can be a single machine deployment where the data model would be stored locally on the computer machine used by the business user that seeks answers for business questions.

Modern spreadsheet programs are able to serve as consumption endpoints for business intelligence and analytics systems' users. They can do so by submitting queries on behalf of the business users that can be run against data models. In MICROSOFT® EXCEL®, there is the ability to both create a data model locally by using the PowerPivot add-in, and to query that data model directly from the instance of EXCEL® by using PivotTables and PivotCharts. The ability to both store and query locally is achieved by using a data model that stores data in the form of collections of tables (hence the name "tabular model" or "tabular data model") and storing the tabular data model in-memory as part of the EXCEL® workbook in oppose to on-disk as it is done by most database systems and by most analytics systems. The storing in-memory allows rapid access and high bandwidth access to large volumes of data by the EXCEL® client submitting queries against the model.

In order to allow storage of large volumes of data in memory, tabular data models in EXCEL® are compressed using techniques that leverage the relatively low number of unique values across a single column in a table, and storing just the value and its repetition. When the EXCEL® workbook is saved, the model maintains its compression by being stored as minor representation of its footprint in-memory, directly on the machine's disk.

BRIEF SUMMARY

At least one embodiment described herein relates to a size reducer for tabular data models. As the tabular data model is being created (e.g., upon pulling the data from the data source into the tabular data model by an analytics system), the size reducer evaluates one or more columns of the tabular data model. For a given column, the memory burden and data type of the column are determined Based on this information, the size reducer automatically determines at least one modification that can be made to the column (as compared to the source column at the data source) in order to reduce the size of the column's burden in the tabular data model. Example modifications might include splitting of column as compared to its source column in the data source, removing information (e.g., rounding) from a column as compared to its source column, and even eliminating columns from the data model representation that are present in the data source.

Thus, the size reducer allows the tabular data model representation to be smaller than what it would be if it was directly reflecting the data source(s). Thus, the data model can contain more effective data that can be analyzed more quickly and efficiently. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a size reducer for tabular data models is described. As the tabular data model is being created (e.g., upon pulling the data from the data source into the tabular data model by an analytics system), the size reducer evaluates one or more columns of the tabular data model. For a given column, the memory burden and data type of the column are determined Based on this information, the size reducer automatically determines modification(s) that can be made to the column (as compared to the source column at the data source) in order to reduce the size of the column's burden in the tabular data model. The modifications may then be made to the column. This may be repeated for multiple columns based on their data type. Thus, the size reducer allows the tabular data model representation to be smaller than what it would be if it was directly reflecting the data source(s). Thus, the tabular data model can contain more effective data that can be analyzed more quickly and efficiently.

For instance, if the source column were for a specific date and time, where the time was represented with high precision, most of the values of that column could be unique, and thus there might be little opportunity to compress the column as it is. However, the size reducer might split the column as represented in the tabular data model into a date column and a time column. Now, the date column represents much fewer unique values, and thus could be greatly compressed in the tabular data model as compared to the compression that would be possible with the source column without being split.

As another example, if the source column were for a floating point value, the number of unique values might be reduced by rounding off several of the least significant digits of the floating point value. Not only would this reduce the amount of space needed for each column entry, but this would also reduce the number of unique values of the floating point number, allowing the column in the tabular data model to be compressed more than would be possible without such rounding.

As a further example, some source columns may not be represented in the tabular data model at all if not helpful for business analytics. For instance, consider the primary key column of a fact table. Such a column contains all unique values, but the column is not used to relate the fact table to other data, and thus is not used in the analytics. Accordingly, the size reducer might reduce the size of this column by not representing the column at all in the tabular data model.

Some introductory discussion of a computing system will be described with respect to FIG. 1. Then, the principles of operation of the size reducer will be described with respect to FIGS. 2 through 4.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
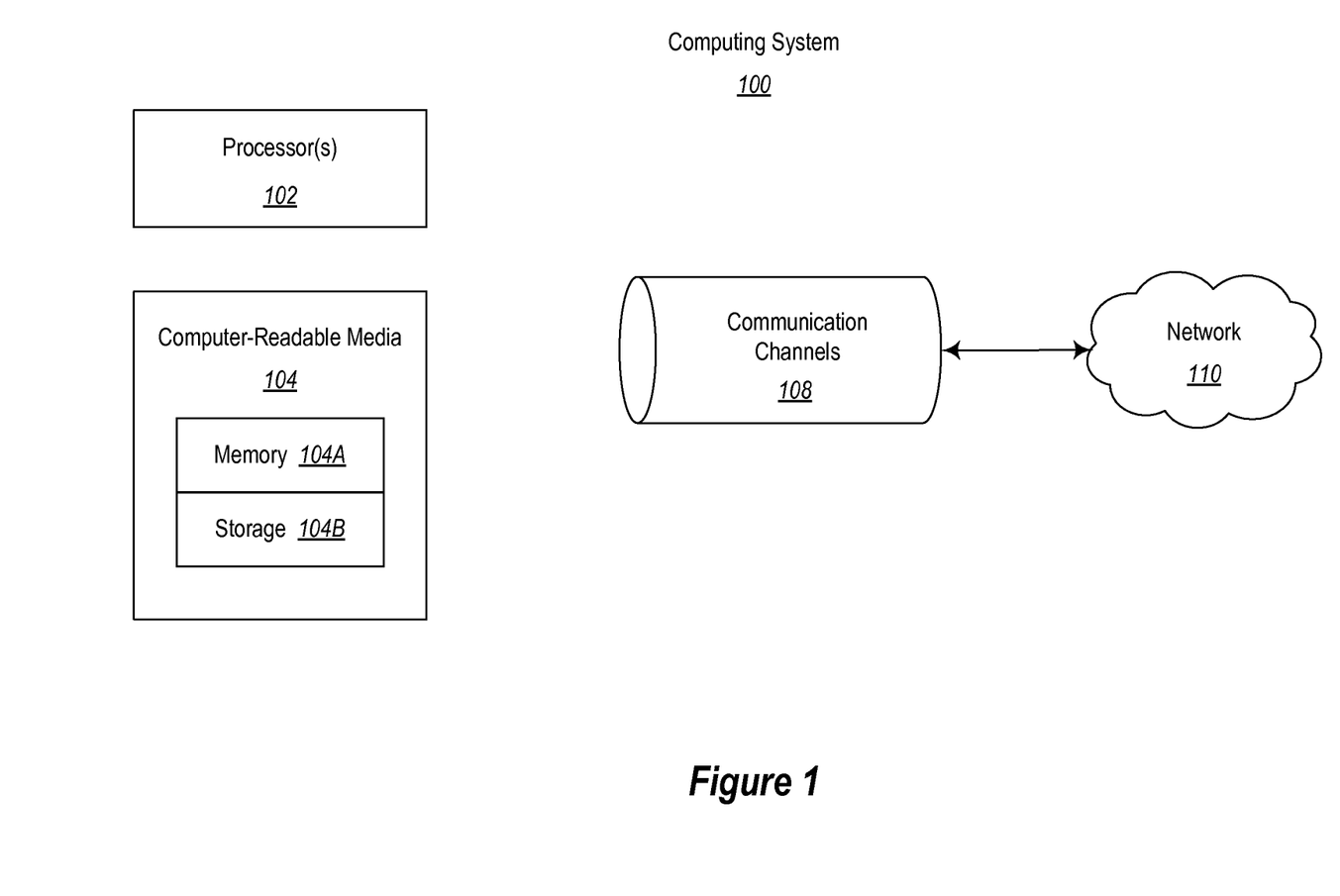
FIG. 1 abstractly illustrates a computing system in which some embodiments described herein may be employed.

As illustrated in FIG. 1, in its most basic configuration, a computing system 100 typically includes at least one processing unit 102 and computer-readable media 104. The computer-readable media 104 may include physical system memory 104A, which may be volatile, non-volatile, or some combination of the two. The computer-readable media 104 also includes non-volatile mass storage such as physical storage media 104B. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
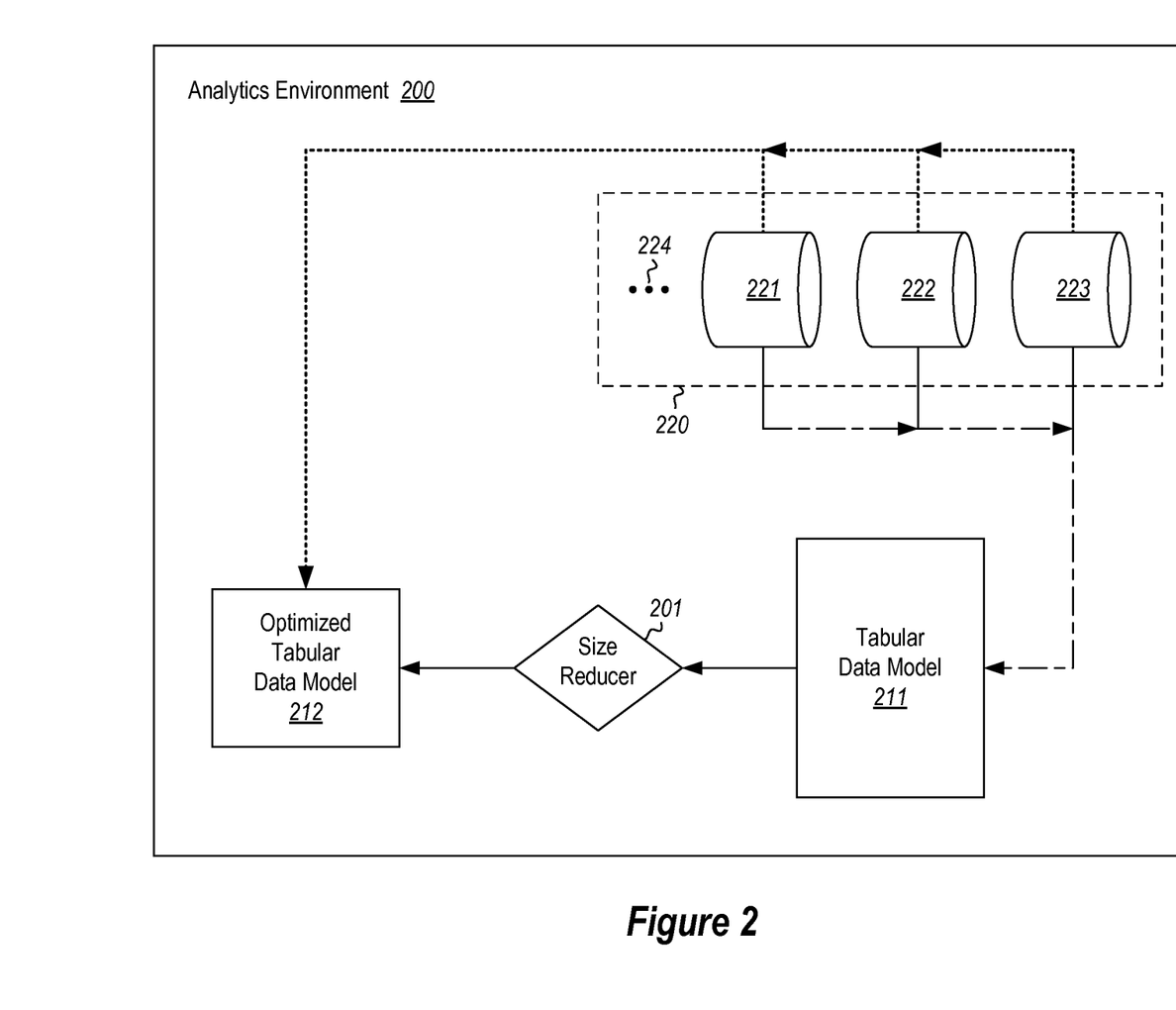
FIG. 2 illustrates an analytics environment in which a size reducer, consistent with the principles described herein, is used to reduce the size of a tabular data model compared to the size that it would be if it directly reflected the data at the data source(s)

FIG. 2 illustrates an analytics environment 200 that includes multiple data sources 220, a size reducer 201, a non-optimized tabular data model 211, and an optimized tabular data model 212. The non-optimized tabular data model 211 abstractly represents the tabular data model as it might be without the size reduction offered by the size reducer 201. The optimized tabular data model 212 abstractly represents the tabular data model after having benefited by the size reduction offered by the size reducer 201. The term "optimized" with respect to the tabular data model 212 should not be construed as representing that there are not further size reductions that could be made, but only that the size is reduced as compared to the non-optimized tabular data model 211.

As a side note, the non-optimized tabular data model 211 is illustrated for comparison only. The optimized tabular data model 212 is created as data is pulled from the external data sources 220. Accordingly, it is entirely possible that the non-optimized tabular data model 211 does not get fully created. Rather, the optimized tabular data model 212 may be constructed column by column as data is pulled from the external data sources 220. As an alternative, perhaps the non-optimized tabular data model 211 is indeed first created, and then the size reducer 201 acts to generate the optimized tabular data model 212.

The size reducer 201 reduces the size of the optimized tabular data model 212 with negligible or no effect on the useful information within the optimized tabular data model 212. The size reducer 201 may be software module that is instantiated and/or operated by executing computer-executable instructions embodied on a computer-readable media included within a computer program product.

Although not required, the optimized tabular data model 212 and the size reducer 201 may operate on a single computing system, such as the computing system 100 of FIG. 1. This may be the same computing system that performs the business analytics on the optimized data model 212 to answer complex questions posed by various business users. However, in a client-server model, perhaps the optimized tabular data model 212 is present on the server, and the business analytics logic is present on the client. The principles described herein apply in either embodiment.

The external data sources 220 are illustrated as including data sources 221, 222 and 223, although the ellipses 224 represents that any number of external data sources may be pulled from in order to create the tabular data model. As an example, such external data sources may be on-line feeds, databases, relational database tables, or non-relational databases. Such extracted data may become columns in the tabular data model 212.

Figure 3:
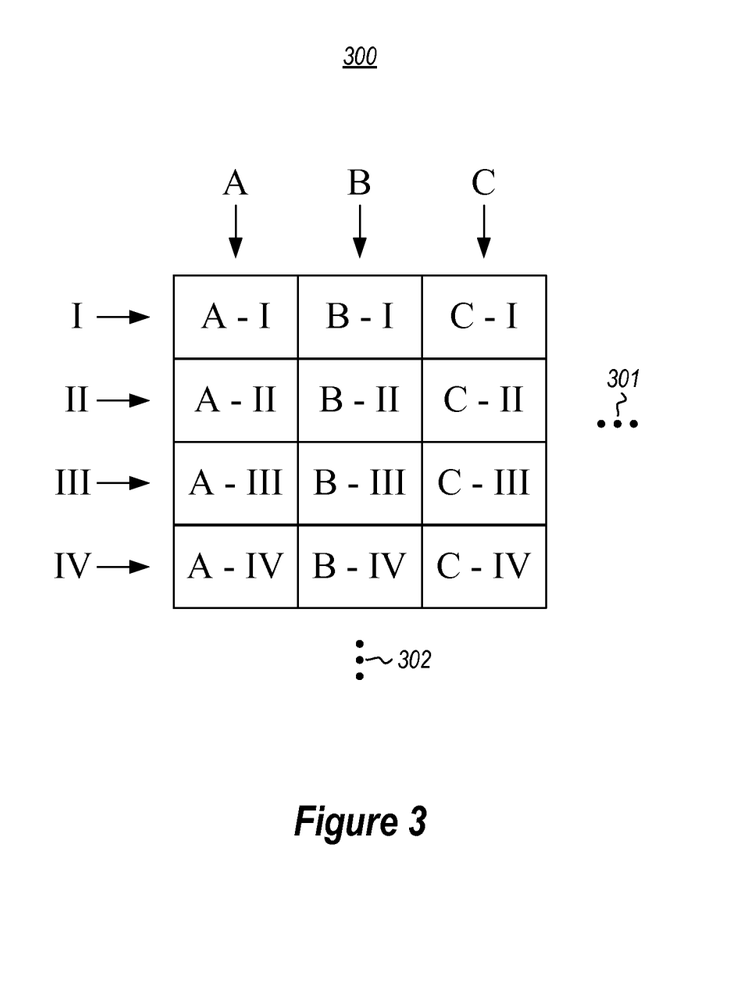
FIG. 3 illustrates a simple example table having multiple columns and multiple rows.

For instance, FIG. 3 illustrates a simple example table 300 in which there are three columns A, B and C, and four rows I, II, III and IV. The ellipses 301 and 302 represent that there may be many more columns and rows, respectively. At the intersection of a row and column, there is a value. For instance, the intersection of column X (where X equals the column identifier A, B, or C) and row Y (where Y equals the row identifier I, II, III or IV) is represented by the nomenclature X-Y. The table 300 may be a single table (as would be a spreadsheet) or may be multiple logically related tables (as would be a relational database or a tabular data model). As previously mentioned, the amount that each column may be compressed is inversely related to the number of unique values within the column.

Figure 4:
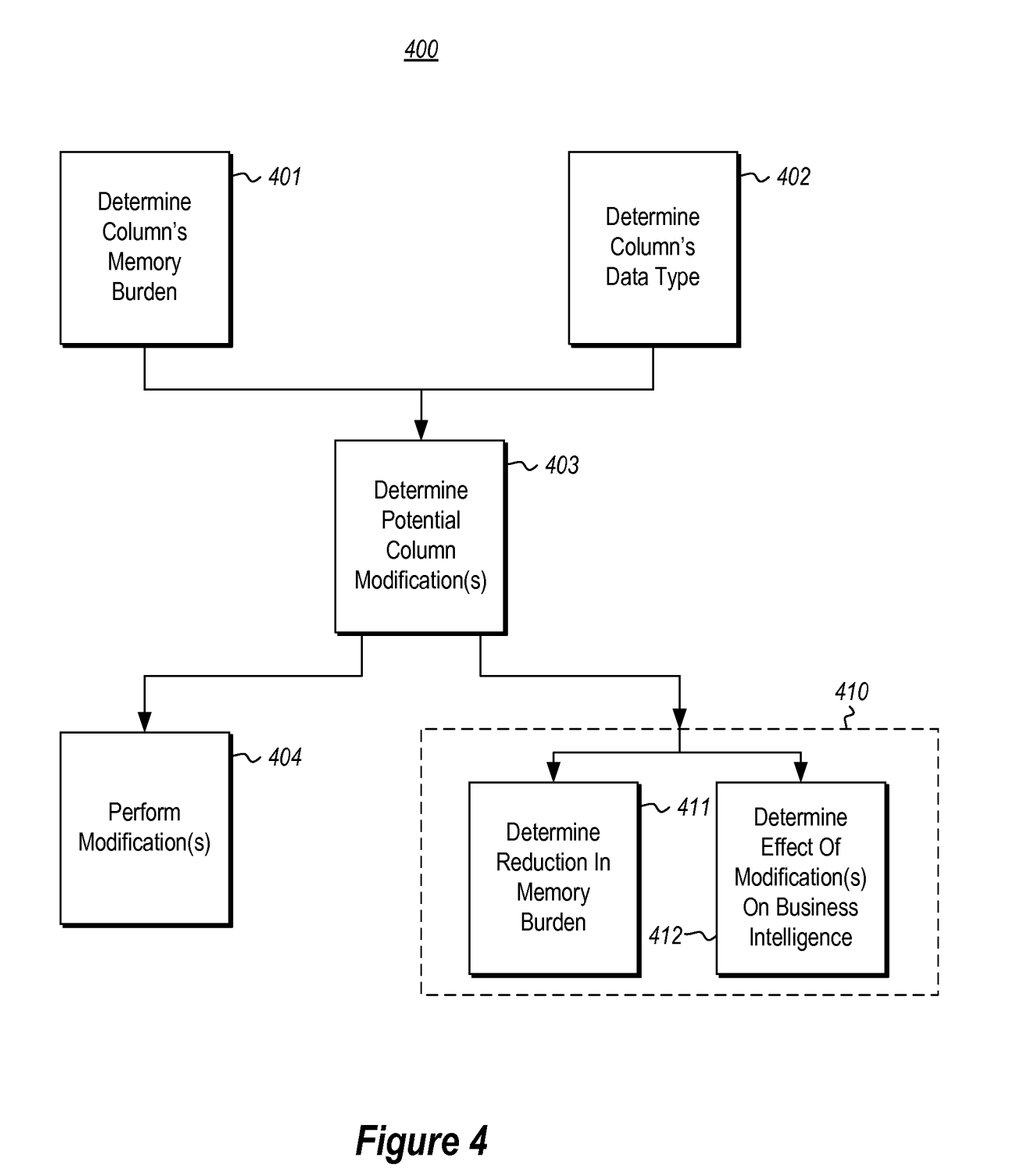
FIG. 4 illustrates a flowchart of a method for evaluating a column of the tabular data model for at least one column of the data model.

FIG. 4 illustrates a flowchart of a method 400 for evaluating a column of the data model. The size reducer 201 might perform the method 400 for at least some of the columns of the tabular data model in determining how to reduce the size of the tabular data model. The size reducer 201 could perform the method 400 for each column as data is extracted from each source column of the external data sources 220. Alternatively, the performance of the method might be delayed until a non-optimized tabular data model 211 is full created.

The method 400 first determines a memory burden imposed a column of the tabular data model 211 (act 401). For instance, if each and every entry within a column is unique, then it is difficult to compress the column at all. In that case, the size of the column will be about the size of each entry multiplied by the number of entries. On the opposite extreme, if each entry in the column is the same value, then the column may be greatly compressed to essentially include just one entry, and some indication that all of the rest of the entries are the same. In between these two extremes, there is large variability in the amount of column compression possible, with more compression being possible if the column has fewer unique values, and less compression being possible if the column has more unique values. The tabular data models 211 and 211 include mechanisms for representing each column in compressed form as permitted by the level of uniqueness of the column's values. The method also determines a data type of the respective column (act 402).

For instance, in one embodiment, the size reducer 201 may determine to perform the method 400 if the memory burden of the column is above a certain level, or is one of the top some percentage of the columns in terms of size, or is one of the top number of columns in size. This determination might also be meshed with the determination of the data type. For instance, the method 400 may be performed for each column of a particular type and having a certain size threshold.

Based at least on the data type of the column, and potentially also based on the memory burden, the size reducer 201 determines at least one modification that can be made to the column (as compared to the source column at the data source) in order to reduce the size of the column's burden in the tabular data model (act 403).

In order to perform scenario analysis 410, the size reducer 201 might determine an amount of space savings associated with one or more the modifications (act 411). The size reducer 212 may interact with the tabular data model 211 in order to run through the results that would be obtained by performing some modifications. In "what if" analysis, a user or a logical component may evaluate the results for information purposes and/or to determine whether the modification should actually be made. For instance, if there is only a small space savings, and a substantial level of sacrifice in business information, the change might not be made. The goal of the business intelligence may be factored in to determine whether the benefits of making the change (e.g., less memory utilization) outweigh the detriments (e.g., potential loss of useful information for the business intelligence).

Another aspect of scenario analysis 410 may be to determine an effect of the modification on the business intelligence (act 412). For instance, if the modification results in some even small alteration in the data itself, that small change might affect calculated columns that depend, directly or indirectly, on that altered data. Thus, small changes might cascade throughout the data model, and result in unintended consequences. The size reducer 201 may walk through the various functions that might depend from the column proposed to be modified in order to evaluate whether negative consequences might result to the business intelligence if the modification is applied.

In addition, or as an alternative, to performing the scenario analysis 410, the size reducer may actually perform one or more of the modifications on the column (act 404) to thereby generate a smaller representation of the column in the optimized tabular data model 212 as compared to the size of the column that would be in the non-optimized tabular data model 211. Several examples of such modifications will now be described.

One modification is to not represent a column of the data source in the optimized tabular data model 212 at all. This may be performed in certain situations where the absence of the column has little or no effect on the business intelligence. For instance, if the column represents artifacts that were used in the external data source, but no longer have relevance to the tabular data model, those columns may be deleted entirely. An example of such a column is a primary key column of a fact table.

A fact table is normally very large. In a relational table structure and in a tabular data model, the fact table may be the largest of the tables. Furthermore, the primary key column has all unique values. These considerations combined mean that by eliminating the primary key column of the fact table, the size of the optimized tabular data model 211 may be considerably reduced. Furthermore, the primary key column of the fact table is not used to establish a link with another table and is not otherwise used in typical business intelligence applied to the data model that includes the fact table. Accordingly, eliminating the key column of the fact table does not harm the business intelligence.

Another modification that might be done to a column is to split the column into multiple constituent columns as compared to the source column in the data source. Depending on the data type, this may have the effect of considerably reducing the number of unique values within one or more of the constituent columns For instance, suppose that the data type of a particular column of the data source was a date/time column indicating the data and time an order for a product was placed. While there may be literally hundreds of millions of entries in the column, consider the following simplified example of Table 1 in which there are only ten values in the column In this example, the time resolution recorded for the order is down to the millisecond.

TABLE 1

| DATE/TIME |
| --- |
| Nov. 15, 2012, 10:15:39.431 AM |
| Nov. 15, 2012, 10:16:11.909 AM |
| Nov. 15, 2012, 10:19:49.018 AM |
| Nov. 15, 2012, 10:19:52.332 AM |
| Nov. 15, 2012, 10:25:25.811 AM |
| Nov. 15, 2012, 10:25:27.169 AM |
| Nov. 15, 2012, 10:25.34.587 AM |
| Nov. 15, 2012, 10:28:11.234 AM |
| Nov. 15, 2012, 10:28:45.699 AM |
| Nov. 15, 2012, 10:28:57.102 AM |

Each value within the column is unique, and thus the unmodified column represents very little opportunity for further compression.

Now suppose the column of Table 1 as represented in the data source is split into two columns as represented in the optimized tabular data model 212, one column for the date and one column for the time as shown in the following Table 2:

TABLE 2

| DATE | TIME |
| --- | --- |
| Nov. 15, 2012 | 10:15:39.431 AM |
| Nov. 15, 2012 | 10:16:11.909 AM |
| Nov. 15, 2012 | 10:19:49.018 AM |
| Nov. 15, 2012 | 10:19:52.332 AM |
| Nov. 15, 2012 | 10:25:25.811 AM |
| Nov. 15, 2012 | 10:25:27.169 AM |
| Nov. 15, 2012 | 10:25.34.587 AM |
| Nov. 15, 2012 | 10:28:11.234 AM |
| Nov. 15, 2012 | 10:28:45.699 AM |
| Nov. 15, 2012 | 10:28:57.102 AM |

While the time column contains all unique values and thus is not further compressed by this splitting modification, the date column contains only one value; namely "Nov. 15, 2012". Thus, the date column can be greatly compressed due to the column splitting operation. Thus, by representing two columns in the optimized tabular data model 212 that collectively correspond to a single column in the external data source, the size of the optimized tabular data model 212 is reduced.

In one example, by doing scenario analysis, the size reducer discovers that by splitting the date/time column into three columns as represented in the optimized tabular data model 212 (a data column, an hour/minutes column, and a seconds column), the size of the optimized tabular data model may be even further reduced. Table 3 illustrates this example.

TABLE 3

| DATE | HOUR/MINUTES | SECONDS |
|---|---|---|
| Nov. 15, 2012 | 10:15 AM | 39.431 |
| Nov. 15, 2012 | 10:16 AM | 11.909 |
| Nov. 15, 2012 | 10:19 AM | 49.018 |
| Nov. 15, 2012 | 10:19 AM | 52.332 |
| Nov. 15, 2012 | 10:25 AM | 25.811 |
| Nov. 15, 2012 | 10:25 AM | 27.169 |
| Nov. 15, 2012 | 10:25 AM | 34.587 |
| Nov. 15, 2012 | 10:28 AM | 11.234 |
| Nov. 15, 2012 | 10:28 AM | 45.699 |
| Nov. 15, 2012 | 10:28 AM | 57.102 |

Again, the date column may be greatly compressed since there is but one unique value in that column. Although the seconds column contains all unique values, the amount memory used per entry is reduced since each entry only includes seconds data. The hour/minutes column includes five unique entries and thus a medium level of compression may be applied to the hour/minutes column.

Another type of modification includes removing information from the column. For instance, suppose that the milliseconds data really is not that important to the business analysis. By removing the milliseconds data, the size of each entry in the date/time column of Table 1, the time column in Table 2, and the second column in Table 3 is reduced.

In some cases, the removal of milliseconds may reduce the amount of unique values in the column, although this effect is not seen by examining Tables 1 through 3. However, suppose that in the example of Table 1, all seconds data could be removed from the column as represented in the optimized tabular data model as compared to the external data source. In Table 1, this single modification would result in the date/time column having only 5 unique values as shown in the following Table 4.

TABLE 4

| DATE/TIME |
|---|
| Nov. 15, 2012, 10:15 AM |
| Nov. 15, 2012, 10:16 AM |
| Nov. 15, 2012, 10:19 AM |
| Nov. 15, 2012, 10:19 AM |
| Nov. 15, 2012, 10:25 AM |
| Nov. 15, 2012, 10:25 AM |
| Nov. 15, 2012, 10:25 AM |
| Nov. 15, 2012, 10:28 AM |
| Nov. 15, 2012, 10:28 AM |
| Nov. 15, 2012, 10:28 AM |

This removal of seconds information would also result in the time column of Table 2 being reduced from 10 unique values to 5 unique values. Accordingly, by removing information from a column, not only is the size of the entry reduced, but the compressibility of the column as a whole may be increased by reducing the number of unique values. The removal of seconds information results in the complete removal of the seconds column in Table 3.

As another example of removal of information from a column, suppose that a column represented a floating point value, one or more of the least significant digits may be beneficially removed from the floating point value to reduce the size of each entry, and potentially also increase the compressibility of the column if the rounding resulted in fewer unique values in the column.

Thus, the principles described herein provide an effective technique and mechanism for reducing a size of a tabular data model. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored thereon computer-executable instructions that are structured such that, when executed by one or more processors of a computing system, cause the computing system to operate a size reducer for tabular data models, the size reducer configured to perform a method for evaluating a plurality of records in at least one column of a tabular data model, the method comprising the following:

determining a data type of a column of the tabular data model;

determining a memory burden imposed by the column of the tabular data model;

determining whether the memory burden imposed by the column of the tabular data model exceeds a predetermined level;

comparing a size of the column against sizes of other columns of the tabular data model to determine whether the size of the column is within a selected top size percentile for columns included within the tabular data model;

in response to determining that the size of the column is within the selected top size percentile, automatically making a modification to the column to reduce the memory burden of the column, the modification including at least:

determining that the memory burden of the column of the tabular data model exceeds the predetermined threshold;

identifying a modification that is compatible with the determined data type;

automatically performing the compatible modification by splitting the column into at least two columns such that a first portion of each record of a plurality of records of the column is stored in a first column of the at least two columns and a different portion of each record of the plurality of records is stored in a corresponding second column such that a corresponding relationship between the first column and the second column is established for each record; and removing a portion of redundant data for a particular record from the first column of the at least two columns while retaining data for the particular record in the corresponding second column and while maintaining the corresponding relationship between the first column and the second column for the record.

2. The computer program product in accordance with claim 1, wherein making the modification is performed by interacting with the tabular data model.

3. The computer program product in accordance with claim 1, the method further comprising:

determining an amount of memory savings associated with the modification.

4. The computer program product in accordance with claim 1, the method further comprising:

performing a utilization analysis to determine an effect of the modification.

5. The computer program product in accordance with claim 1, wherein a different modification is also performed to reduce the memory burden of the column, including at least omitting a column in the tabular data model that is present in an external data source.

6. The computer program product in accordance with claim 5, wherein the column represents a primary key of a fact table.

7. The computer program product in accordance with claim 5, wherein the column represents artifacts from the external data source.

8. The computer program product in accordance with claim 1, wherein the data type comprises a date and time, and wherein, after splitting the column, the first column of the at least two columns includes a date portion, and the second column of the at least two columns includes a time portion.

9. The computer program product in accordance with claim 1, wherein the data type of the column is a floating point number, and wherein prior to removing at least the portion of redundant data, one or more less significant digits of the floating point number are removed.

10. The computer program product in accordance with claim 1, wherein the data type of the column comprises a time, and wherein the removed portion of the redundant data includes smaller time increments of time.

11. The computer program product in accordance with claim 1, the method further comprising:
pulling selected data from an external data source to form the tabular data model.

12. The computer program product in accordance with claim 1, the method further comprising:
pulling selected data from a plurality of data sources, including an external data source, to form the tabular data model.

13. The computer program product in accordance with claim 1, wherein automatically determining the modification is performed by interacting with the tabular data model.

14. A method for representing a data model in memory, the method comprising:
pulling selected data from one or more data sources to formulate at least a portion of a tabular data model;
determining a data type of a column of the tabular data model;
determining a memory burden imposed by the column of the tabular data model;
determining whether the memory burden imposed by the column of the tabular data model exceeds a predetermined level;
comparing a size of the column against sizes of other columns of the tabular data model to determine whether the size of the column is within a selected top size percentile for columns included within the tabular data model;
in response to determining that the size of the column is within the selected top size percentile, automatically performing a modification to reduce the memory burden of the column, the modification including at least:
determining that the memory burden of the column of the tabular data model exceeds the predetermined threshold;
identifying a modification that is compatible with the determined data type;
performing the compatible modification by splitting the column into at least two columns such that a first portion of each record of a plurality of records of the column is stored in a first column of the at least two columns and a different portion of each record of the plurality of records is stored in a corresponding second column such that a corresponding relationship between the first column and the second column is established for each record; and
removing a portion of redundant data for a particular record from the first column of the at least two columns while retaining data for the particular record in the corresponding second column and while maintaining the corresponding relationship between the first column and the second column for the record.

15. The method in accordance with claim 14, wherein the modification is performed by a spreadsheet program or a relational database program.

16. A computing system comprising:
one or more processors; and
one or more computer-readable storage media having stored thereon computer-executable instructions that are structured such that, when executed by the one or more processors, cause the computing system to implement a method comprising the following:
determining a data type of a column of tabular data model;
determining a memory burden imposed by the column of the tabular data model;
determining whether the memory burden imposed by the column of the tabular data model exceeds a predetermined level;
comparing a size of the column against sizes of other columns of the tabular data model to determine whether the size of the column is within a selected top size percentile for columns included within the tabular data model;
in response to determining that the size of the column is within the selected top size percentile, automatically making a modification to the column to reduce the memory burden of the column, the modification including at least:
determining that the memory burden of the column of the tabular data model exceeds the predetermined threshold;
identifying a modification that is compatible with the determined data type;
automatically performing the compatible modification by splitting the column into at least two columns such that a first portion of each record of a plurality of records of the column is stored in a first column of the at least two columns and a different portion of each record of the plurality of records is stored in a corresponding second column such that a corresponding relationship between the first column and the second column is established for each record; and
removing a portion of redundant data for a particular record from the first column of the at least two columns while retaining data for the particular record in the corresponding second column and while maintaining the corresponding relationship between the first column and the second column for the record.

17. The computing system of claim 16, wherein the modification further includes splitting the column of the tabular data model into three columns in order to separate different data portions from the column into three columns.

18. The computing system of claim 16, wherein the modification further includes deleting data that is determined to be irrelevant to the tabular data model.

* * * * *